United States Patent [19]
Reynolds et al.

[11] Patent Number: 5,758,352
[45] Date of Patent: May 26, 1998

[54] COMMON NAME SPACE FOR LONG AND SHORT FILENAMES

[75] Inventors: Aaron R. Reynolds, Redmond; Dennis R. Adler, Mercer Island; Ralph A. Lipe, Woodinville; Ray D. Pedrizetti, Issaquah; Jeffrey T. Parsons; Rasipuram V. Arun, both of Redmond, all of Wash.

[73] Assignee: Microsoft Corporation, Redmond, Wash.

[21] Appl. No.: 711,692

[22] Filed: Sep. 5, 1996

Related U.S. Application Data

[63] Continuation of Ser. No. 427,004, Apr. 24, 1995, Pat. No. 5,579,517, which is a continuation of Ser. No. 41,497, Apr. 1, 1993, abandoned.

[51] Int. Cl.$^6$ ............................................. G06F 17/30
[52] U.S. Cl. ............................. 707/200; 707/1; 707/6
[58] Field of Search ............................ 395/600; 364/200

[56] References Cited

U.S. PATENT DOCUMENTS

| | | | |
|---|---|---|---|
| 4,780,821 | 10/1988 | Crossley . | |
| 4,987,531 | 1/1991 | Nishikado et al. | 364/200 |
| 5,307,494 | 4/1994 | Yasumatsu et al. | 395/600 |
| 5,313,646 | 5/1994 | Hendricks et al. | 395/600 |
| 5,359,725 | 10/1994 | Garcia et al. | 395/500 |
| 5,363,487 | 11/1994 | Willman et al. . | |
| 5,371,885 | 12/1994 | Letwin | 395/600 |
| 5,388,257 | 2/1995 | Bauer | 395/600 |
| 5,392,427 | 2/1995 | Barrett et al. . | |
| 5,412,808 | 5/1995 | Bauer | 395/600 |
| 5,421,001 | 5/1995 | Methe | 395/500 |
| 5,434,974 | 7/1995 | Loucks et al. . | |
| 5,437,029 | 7/1995 | Sinha . | |
| 5,483,652 | 1/1996 | Sudama et al. . | |
| 5,535,375 | 7/1996 | Eshel et al. . | |

FOREIGN PATENT DOCUMENTS

| | | | |
|---|---|---|---|
| 1041039 | 2/1989 | Japan | G06F 12/00 |
| 1315843 | 12/1989 | Japan | G06F 12/00 |
| 2148341 | 7/1990 | Japan | G06F 12/00 |
| 6019763 | 1/1994 | Japan | G06F 12/00 |

OTHER PUBLICATIONS

Hurwicz, Mike, "MS–DOS 3.1 Makes It Easy to Use IBM PCs on a Network," *Data Communications*, Nov., 1985.

"The Intelligent Way to Search," News Release. Dateline: Burlington, MA. Oct., 1987.

Trivette, Donald B., "Utility Provides 60–Character Filenames," *PC Magazine*, vol. 7, N. 16, p.56(1), Sep., 1988.

"File sharing Protocol," Microsoft Corporation, Nov. 7, 1988.

Bonner, Paul, "What's in a Name?," *PC–Computing*, vol. 2, N. 9, p. 169(2), Sep., 1988.

Duncan, Ray, "Power Programming Using Long Filenames and Extended Attributes, Part 1," *PC Magazine*, pp. 317–323, Apr. 24, 1990.

McCormick, John, "Presentation Manager Under OS/2 Encourages Lengthy Name–Calling," *Government Computer News*, vol. 9, N. 10, p. 16(2), May 14, 1990.

Duncan Ray, "Power Programming Using Long Filenames and Extended Attributes, Part 2," *PC Magazine*, pp. 305–309, May 15, 1990.

(List continued on next page.)

*Primary Examiner*—Thomas G. Black
*Assistant Examiner*—Cheryl R. Lewis
*Attorney, Agent, or Firm*—Christensen O'Connor Johnson & Kindness PLLC

[57] ABSTRACT

An operating system provides a common name space for both long filenames and short filenames. In this common namespace, a long filename and a short filename are provided for each file. Each file has a short filename directory entry and may have at least one long filename directory entry associated with it. The number of long filename directory entries that are associated with a file depends on the number of characters in the long filename of the file. The long filename directory entries are configured to minimize compatibility problems with existing installed program bases.

28 Claims, 8 Drawing Sheets

OTHER PUBLICATIONS

"World Software Corporation (WSC) Launches Extend–A–Name in Europe," *Computer Product Update*, Jul. 27, 1990.

Glass, Brett, "Create Your Own Environment," *PC–Computing*, vol. 3, N. 10, p. 106(6), Oct., 1990.

Bonner, Paul, "Build a Document Manager Under Window," *PC–Computing*, vol. 4, N. 12, p. 275(7), Dec., 1991.

Rohan, Rebecca, "Golden Retriever Fetches Files in Windows," *Computer Shopper*, vol. 12, N. 11, p. 947(1), Nov., 1992.

O'Malley, Chris, "Fetching Desktop Files: Standalone Document Managers," *Window Sources*, vol. 1, N. 2, p. 443(1), Mar., 1993.

"Above Software Introduces Golden Retriever 2.0b'," News Release, Dateline: Irvine, CA, Mar. 29, 1993.

"Breakthrough on DOS File Name Limits," *Newsbytes News Network*, Apr. 12, 1993.

Mallory, Jim, "Breakthrough on DOS Filename Limits," *Newsbytes*, Apr. 12, 1993.

"New Improved Windows," *PC World*, vol. 11, N. 12, p. 252(3), Dec., 1993.

Samuel J. Leffler et al., "The Design and Implementation of the 4.3BSD UNIX Operating System," Addison–Wesley Publishing Company, 1989, Chapter 2, pp. 34–36.

Duncan, Ray, "Design Goals and Implementation of the New High Performance File System," Sep., 1989, pp. 1–13.

Duncan, Ray, "Using Long Filenames and Extended Attributes," PC Magazine, Parts 1 and 2, Apr. 24 and May 15, 1990, vol. 9, Nos. 8 and 9, pp. 317 and 305.

Wang, Y.E.G. "Universal File Names for Ada," Ada Letters, Integrated Software, Inc., New York, NY, Jan./Feb., 1990, pp. 111–117.

File Attributes 42

COMMON NAME SPACE FOR LONG AND SHORT FILENAMES

This application is a continuation of U.S. patent application Ser. No. 08/427,004, filed Apr. 24, 1995, now U.S. Pat. Ser. No. 5,579,517 which is a file wrapper continuation of U.S. patent application Ser. No. 08/041,497, filed Apr. 1, 1993, now abandoned.

TECHNICAL FIELD

The present invention relates generally to data processing systems and, more particularly, to a common name space for long and short filenames.

BACKGROUND OF THE INVENTION

Many operating systems, such as the MS-DOS, version 5, operating system, sold by Microsoft Corporation of Redmond, Wash., support only short filenames. In the MS-DOS, version 5, operating system, filenames may be a maximum length of eleven characters. Each filename may have a main portion of eight characters followed by an extension of three characters. An example filename in the MS-DOS, version 5, operating system is "EXAMPLE1.EXE", wherein "EXAMPLE1" constitutes the main portion and "EXE" constitutes the extension.

Each filename is limited to eleven characters due to constraints in the file system of the MS-DOS, version 5, operating system. This file system employs a directory structure in which each file has a directory entry associated with it. Unfortunately, the directory entry for a file only supports filenames with a maximum length of eleven characters. Such a limit in the length of the filenames is often frustrating to a user. The length limit of eleven characters prevents a user from employing adequately descriptive filenames and, in many instances, forces a user to insert awkward abbreviations of descriptive terms into the filename.

SUMMARY OF THE INVENTION

It is, therefore, an object of the present invention to provide a system that supports long filenames.

It is another object of the present invention to provide a system that supports long filenames while minimizing the compatibility impact of supporting long filenames.

It is a further object of the present invention to provide a system that supports a common name space for both long filenames and short filenames.

In accordance with the first aspect of the present invention, a method is practiced in a data processing system having a memory means and a processing means. In accordance with this method, a first directory entry is created and stored in the memory means for a file. The first directory entry holds a first filename for the file and information about the file. A second directory entry is also created and stored in the memory means. The second directory entry holds at least one portion of a second filename having a fixed number of characters and information about the file. One of the first or second directory entries is accessed in the memory means to gain access to the information contained therein.

In accordance with another aspect of the present invention, a data processing system includes a memory that holds a first directory entry for a file, a second directory entry for the file, and an operating system. The first directory entry includes a first filename for the file and the second directory entry includes the second filename for the file. The second filename includes more characters than the short filename. The data processing system also includes a processor for running the operating system and accessing either the first directory entry or the second directory entry to locate the file.

In accordance with yet another aspect of the present invention, a method is practiced in a data processing system having memory. In accordance with this method, a file is created and the file is assigned a user-specified long filename. The long filename is manipulated with the data processing system to create a short filename of fewer characters. The long filename and the short filename are stored in memory so that the file can be accessed by either the long filename or the short filename.

In accordance with a further aspect of the present invention, a method is practiced in which a first directory entry for a file is stored in a memory means. The first directory entry holds the short filename for the file. The short filename includes at most a maximum number of characters that is permissible by an application program. A second directory entry is also stored in the memory means for the file. A second directory entry holds at least the first portion of a long filename for the file. The long filename includes a greater number of characters than the maximum number of characters that is permissible by the application program. The application program is run on a processor of the data processing system. The application program identifies the file by the short filename.

In accordance with a still further aspect of the present invention, a method is practiced in which a first directory entry is stored in the memory means for a file. The first directory entry holds a short filename for the file that includes at most the maximum number of characters that is permissible by the operating system. A second directory entry is stored in the memory means for the file. The second directory entry holds a long filename for the file that includes more than the maximum number of characters that is permissible by the operating system. In this instance, the operating system does not use long filenames; rather, it uses solely short filenames. The first directory entry is accessed by the operating system to locate the file.

BRIEF DESCRIPTION OF THE DRAWINGS

A preferred embodiment of the present invention will now be described herein with reference to the Drawings. The Drawings include the following Figures.

DETAILED DESCRIPTION OF THE INVENTION

Figure 1:
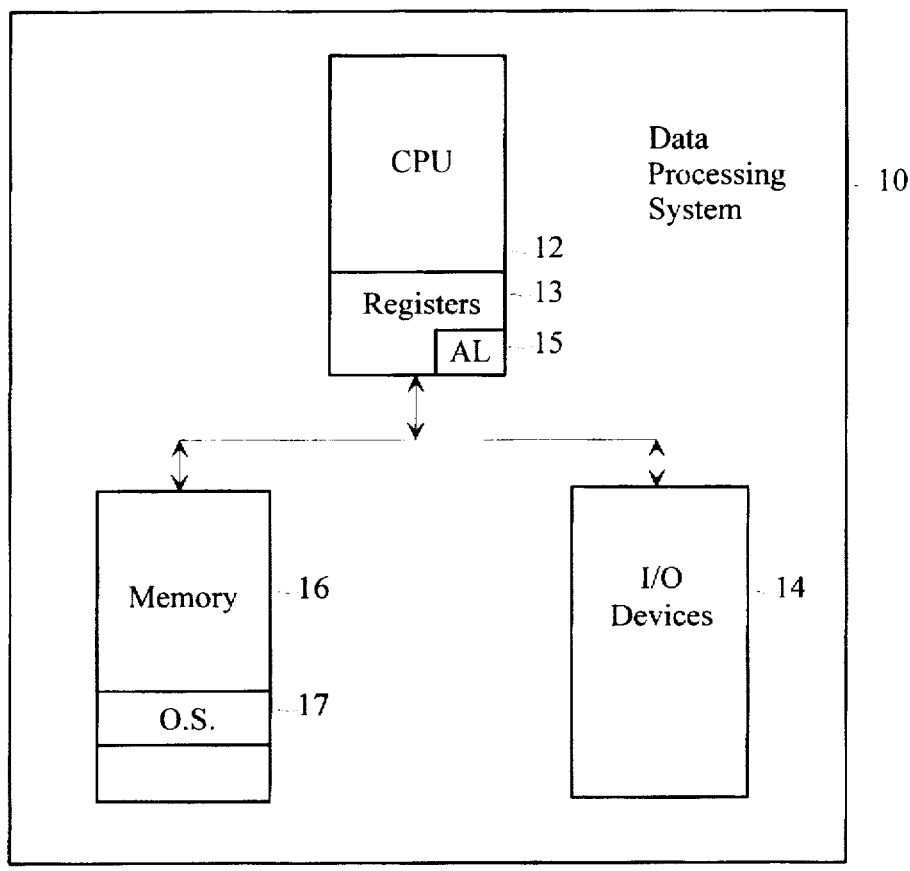
FIG. 1 is a block diagram of a data processing system used for implementing the preferred embodiment of the present invention.

A preferred embodiment of the present invention described herein provides support for the use of long filenames (i.e., filenames that may have substantially more characters than current operating systems, such as the MS-DOS, version 5, operating system permit). "Short filenames" will be used hereinafter to refer to filenames that have a small limit (such as 11 characters) as to the maximum number of characters permitted. In the preferred embodiment, the long filenames are provided in a common name space with the short filenames. A long filename and a short filename are provided for each file in the system. The sharing of a common name space is realized through providing separate directory entries for long filenames and short filenames. Each file has a short filename directory entry associated with it and may also have at least one long filename directory entry. The short filenames are like those provided previously in the MS-DOS, version 5, operating system. The long filenames, as will be described in more detail below, may have a maximum length of up to 255 characters. The preferred embodiment will be described with reference to an implementation with the MS-DOS, version 5, operating system.

The potential compatibility problems of supporting long filenames are apparent by considering one solution to the problem of short filenames. This solution is not part of the present invention and is described herein merely to illustrate how a preferred embodiment avoids the compatibility problems suffered by this proposed solution. This solution supports long filenames by merely increasing the number of characters the operating system permits for a filename.

There are two major difficulties with this solution. First, the existing application bases of many systems use only short filenames (e.g., 11 characters or less) and are not prepared to utilize only long filenames (e.g., up to 255 characters). As an example, an application may allocate a buffer large enough to hold the short filename and if the operating system tries to place long filename data into this buffer, the buffer may overflow so as to cause the application data to be unexpectedly overwritten. Second, certain disk utility programs access the file system volume directly and, thus, do not rely on the operating system to access the files. If the file system is changed to support long filenames, compatibility problems with the disk utility programs arise.

The preferred embodiment of the present invention described herein, in contrast, seeks to minimize the compatibility impact of supporting long filenames by providing both a long filename and a short filename for each file. As a result, applications and utilities that require short filenames still have short filenames available, and applications that use long filenames have long filenames available.

The preferred embodiment of the present invention may be implemented as code realized as software or firmware. In order to support long filenames, the preferred embodiment of the present invention provides several long filename application program interfaces (APIs). These APIs are provided along with the conventional short filename interfaces that are standard with the operating system. The long filename APIs support file operations and directory entries for long filenames. The APIs include a file attributes function, a file delete function, a file directory function, a file find function, a file open/create function and a file rename function.

The preferred embodiment of the present invention may be implemented in a data processing system 10 like that shown in FIG. 1. This data processing system 10 includes a central processing unit (CPU) 12 with a standard set of registers 13 that includes an accumulator (AL) register 15, a memory 16 and input/output (I/O) devices 14. The CPU 12 oversees the operations of the data processing system 10 and has access to the memory 16 and the I/O devices 14. The memory 16 may include both RAM and disc storage. The memory 16 holds an operating system 17 (denoted as "O.S." in FIG. 1) which includes the long and short filename APIs. Those skilled in the art will appreciate that the present invention may be implemented on other suitable data processing systems.

All of the functions for the long filename APIs and short filename APIs are incorporated into the operating system 17. Those functions are supported through an Int 21h interrupt call (where 21h denotes 21 in hexadecimal notation). In other words, all the functions are called by executing an Int 21h interrupt, wherein the function that is called through the Int 21h interrupt is specified by a value placed in a register, as will be described in more detail below. The Int 21h interface is like that provided in the MS-DOS, version 5, operating system except that the interface also supports calls to functions for long filenames. In calls to the long filename APIs, the function number to be called is placed in the AL register 15 of a processor, such as the CPU 12 in FIG. 1 before the interrupt is initiated.

In order to support both a long filename and a short filename for each file, the preferred embodiment provides a short filename directory entry 18 (FIG. 2) and may provide at least one long filename directory entry 20 for each file in a common name space. Each file has a long filename and a short filename associated with it. A long filename directory entry 20 is only created when the long filename cannot be correctly stored in the short filename directory entry. The long filename directory entries 20 are stored adjacent to the corresponding short filename directory entry 18 as part of the common name space used in memory 16. Moreover, the long filename directory entries 20 are configured to minimize compatibility problems with operating systems that support only short filenames.

Figure 2:
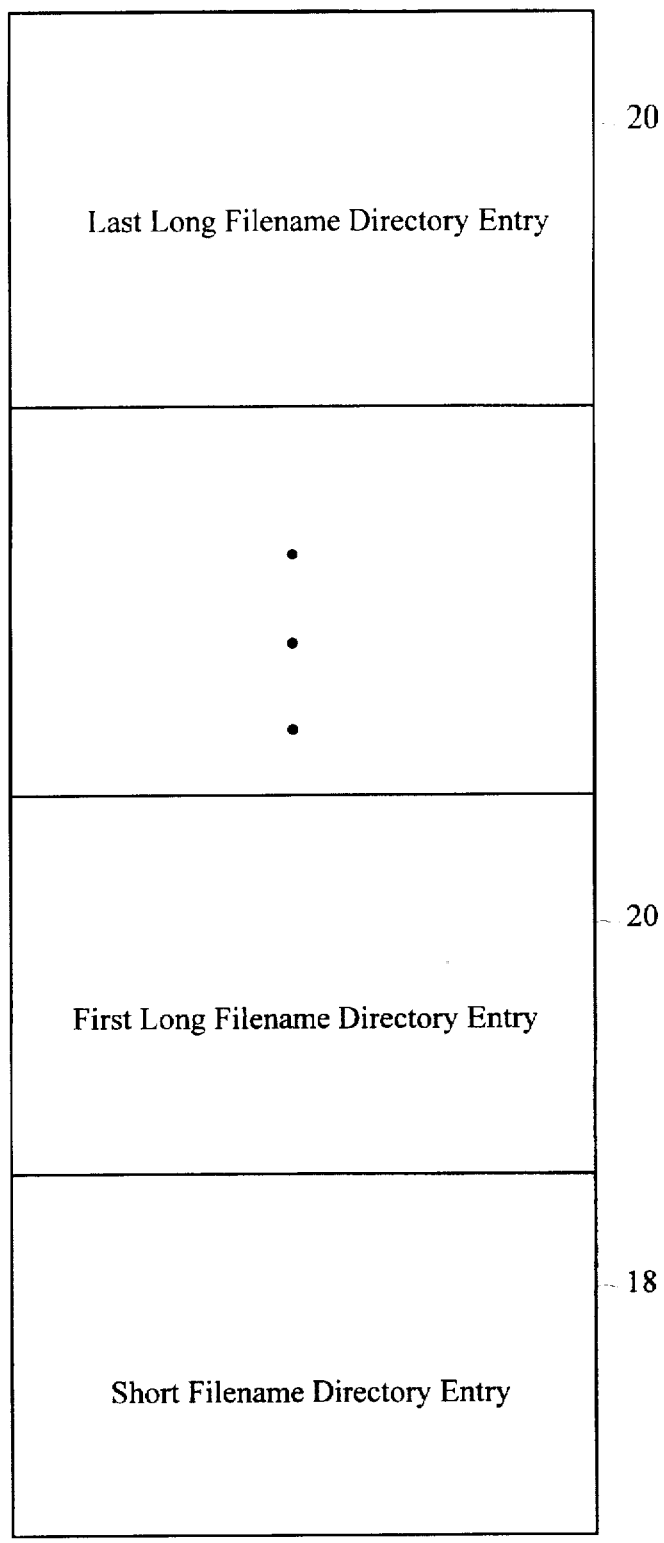
FIG. 2 is a block diagram illustrating the storage of short filename directories in locations adjacent to long filename directory entries.

FIG. 2 shows an example of the directory entries 18 and 20 for a file in the preferred embodiment described herein. The short filename directory entry 18 is provided along with several long filename directory entries 20. The number of long filename directory entries 20 provided (including zero long filename directory entries) for a file depends upon the number and type of characters in the long filename. As will be described in more detail below, each long filename directory entry 20 may hold up to 26 characters of a long filename. The long filename directory entries 20 are dynamically allocated based upon the number of characters in the long filename. For example, a file with a long filename of 50 characters has two long filename directory entries 20 allocated for it, whereas a file with a long filename of 70 characters has three long filename directory entries 20 allocated for it. As was mentioned above, a long filename may have a maximum of 255 characters and thus, a maximum of 10 long filename directory entries 20 may be allocated for any file. The maximum of 255 characters per filename is a product of maximum path length (260 characters) limitations of the operating system 17.

There may be many instances in which the long filename does not completely fill all of the space available in the allocated long filename directory entries 20. In such an instance, a null terminator is placed after the last character of the long filename so that additional spaces or nonsensical data will not be returned. The extra spaces are filled with OFFh (where "h" indicates the use of hexadecimal notation).

Figure 3A:
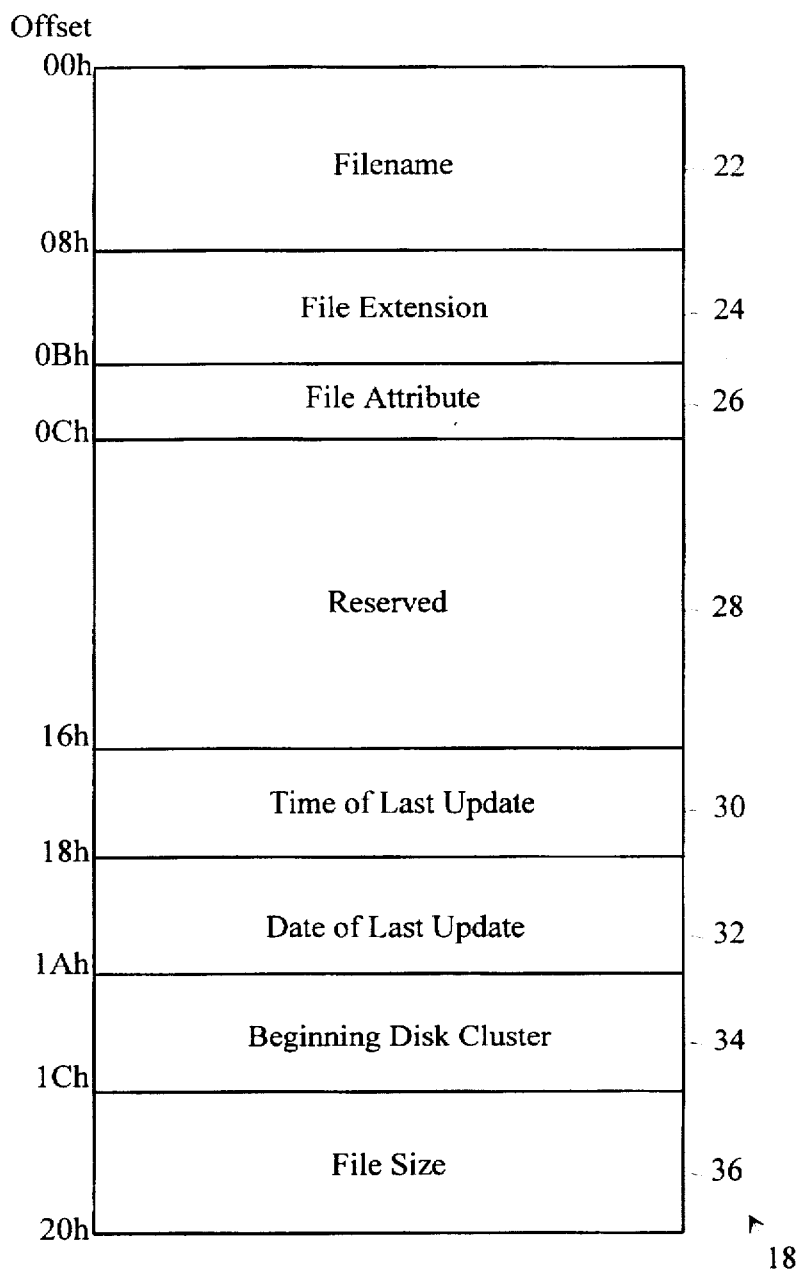
FIG. 3a shows the format of a short filename directory entry in the preferred embodiment of the present invention.

FIG. 3a illustrates the format of the short filename directory entry 18. Each of the fields in the directory entry begins at a different offset relative to the starting address of the directory entry. A filename field 22 holds the main portion (i.e., the leading 8 characters) of the short filename. As the main portion of the short filename may hold up to eight characters of the short filename, the filename field 22 is eight bytes in length and begins at offset 00h. The filename field 22 is followed by a file extension field 24 at offset 08h. The file extension field holds the characters of the extension of the short filename. The extension field 24 is three bytes in length (encoding three characters).

Following the extension field 24 at offset 0Bh is a file attributes field 26. The file attributes field 26 includes a number of bits that, based upon whether the bits are set or not, specify information about the associated file.

The short filename directory entry 18 also includes a reserved field 28. The reserved field 28 begins at offset 0Ch and is ten bytes in length. The short filename directory entry 18 additionally includes a time of last update field 30 and a date of last update field 32. The time of last update field 30 is two bytes in length and begins at offset 16h. The date of last update field 32 is two bytes in length and begins at offset 18h.

The short filename directory entry 18 includes a beginning disk cluster field 34. The beginning disk cluster field 34 holds a pointer to the section of the memory 16 (FIG. 1) where the file's first disk cluster is held (i.e. to the beginning of the allocation chain for the file). This beginning disk cluster field 34 (FIG. 3a) is stored at offset 1Ah and is two bytes in length. A file size field 36 follows the beginning disk cluster field 34. The file size field 36 holds a value that specifies the amount of memory occupied by the file associated with the short filename directory entry 18. The file size field 36 is four bytes in length and begins at offset 1Ch.

Figure 3B:
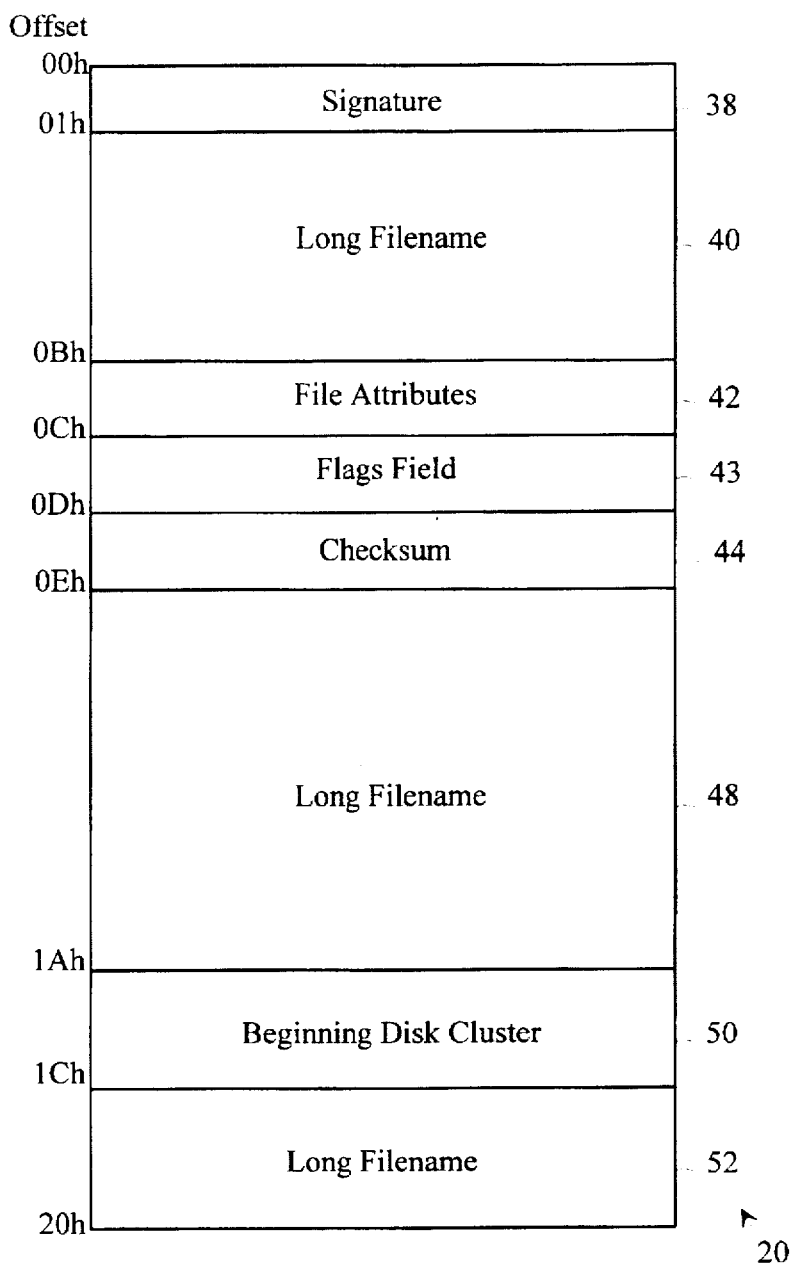
FIG. 3b shows the format of a long filename directory entry in the preferred embodiment of the present invention.

FIG. 3b illustrates the format used for each of the long filename directory entries 20. The long filename directory entry 20 additionally includes a signature field 38 that holds a digital signature. The signature field 38 is useful in specifying the order of a long filename directory entry 20 in a sequence of associated long filename directory entries. For example, a first long filename directory entry includes a signature field 38 that specifies that it is the first entry, and each successive long filename directory entry includes a signature field 38 that specifies where the long filename directory entry fits in the sequence of long filename directory entries for a file. The signature field 38 is provided primarily for use with utility programs that directly access the file system volume. The signature field 38 is one byte in length and begins at offset 00h, which is the beginning of the filename field 22 (FIG. 3a) of the short filename directory entry 18. The signature field 38, given its location in the long filename directory entry, might easily be mistaken for a portion of a short filename by certain utility programs. Hence, the signature field 38 includes only illegal short filename characters so that the characters may not be readily changed by systems or utilities that support only short filenames.

The long filename directory entry 20 includes three fields 40, 48 and 52 that are provided for holding characters of the long filename. The first long filename field 40 begins at offset 01h and may hold up to ten characters of the long filename (i.e., it is 10 bytes in length). The second long filename field 48 begins at offset 0Eh and may hold up to twelve characters (i.e., 12 bytes) of the long filename. Lastly, the third long filename field 52 begins at offset 1Ch and may hold up to four characters (i.e., 4 bytes) of the long filename. Thus, cumulatively, these three fields 40, 48 and 52 may hold up to twenty-six characters of the long filename. The long filename fields 40, 48 and 52 are filled sequentially beginning with field 40 and then filling fields 48 and 52, consecutively.

While the long filename directory entry 20 differs from the short filename directory entry 18, the long filename directory entry 20, nevertheless, includes certain similar fields at the same specified offsets as were discussed above for the short filename directory entry 18 (FIG. 3a). As such, operating systems that do not support long filenames are not disturbed by the long filename directory entries 20. For instance, the long filename directory entry 20 includes a file attributes field 42 which is like the file attributes field 26 (see FIG. 3a) provided in the short filename directory entry.

The long filename directory entry 20 contains a checksum field 44, which is one byte in length and at offset 0Dh. The checksum field 44 holds a checksum of the short filename. The checksum byte, as will be described in more detail below, is used to ensure that the long name is valid for the associated short filename and to act as a pointer to the short filename directory entry 18 that is helpful to disk utility programs. A flags field 43 is held at offset 0Ch. The flags field 43 holds a flag bit that may be set when unicode characters are used. In addition, the beginning disk cluster field 50 (FIG. 3b) of the long filename directory entry 20 is analogous to the beginning disk cluster field 34 (FIG. 3a) of the short filename directory entry 18. However, it always has a constant value of zero in the long filename directory entry.

The above discussion has focused on how the directory entries 18 and 20 (FIG. 2) are used to support both long filenames and short filenames. The discussion below will focus on how such directory entries are supported by the preferred embodiment of the present invention.

Figure 4:
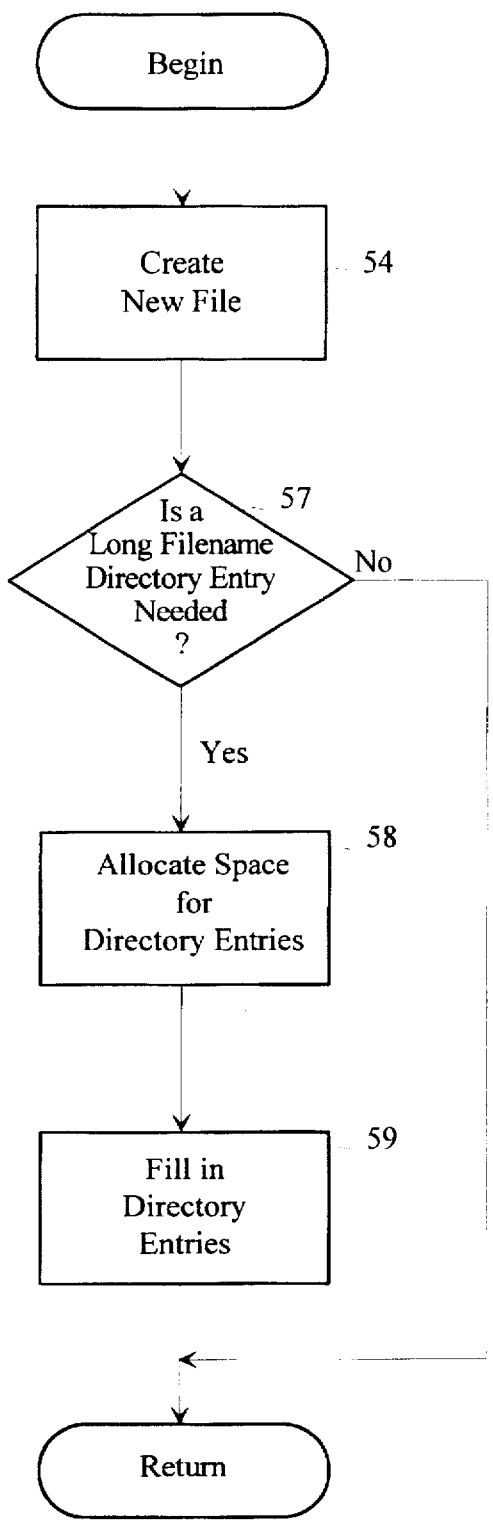
FIG. 4 is a flow chart illustrating the steps performed by the preferred embodiment of the present invention when a new file is created.

When a new file is created, the preferred embodiment must take steps to support both a long filename and a short filename for the new file. In discussing how the preferred embodiment supports both long filenames and short filenames, it is helpful to first focus on the creation of the directory entries and then to focus on the creation of the filenames. FIG. 4 is a flowchart depicting the basic steps performed upon creation of the new file. Initially, the new file is created (step 54) using either a long filename API or a short filename API. Both varieties of APIs support the creation of files. Depending on the type of API that is used to create the files, the file will initially have a long filename and/or a short filename. In other words, if a file is created with a long filename API, it will initially have a long filename and if a file is created with a short filename API, it will initially have a short filename, which may also be the long filename for the file.

At least one long filename directory entry 20 may be created for the file. First, a determination is made whether a long filename directory entry 20 is required (step 51). If the long filename will not correctly fit in the short filename directory entry 18, a long filename directory entry 20 is required. Long filename directory entries 20 are dynamically allocated based upon the number of characters in the long filename. At a minimum, a short filename directory entry 18 will be created that has the format that is shown in FIG. 3a. Thus, the system checks to see how many long filename directory entries are needed and allocates space for the short filename directory entry and as many additional long filename directory entries as are required (step 58). It should be appreciated that when both a short filename directory entry 18 and at least one long filename directory entry 20 are created, space for both types of directory entries are allocated together at the same time. The long and short filename directory entries 18 and 20 are then filled in step 59. However, if no long filename directory entry is required, no space will be allocated (i.e., steps 58 and 59 are skipped).

Figure 5A:
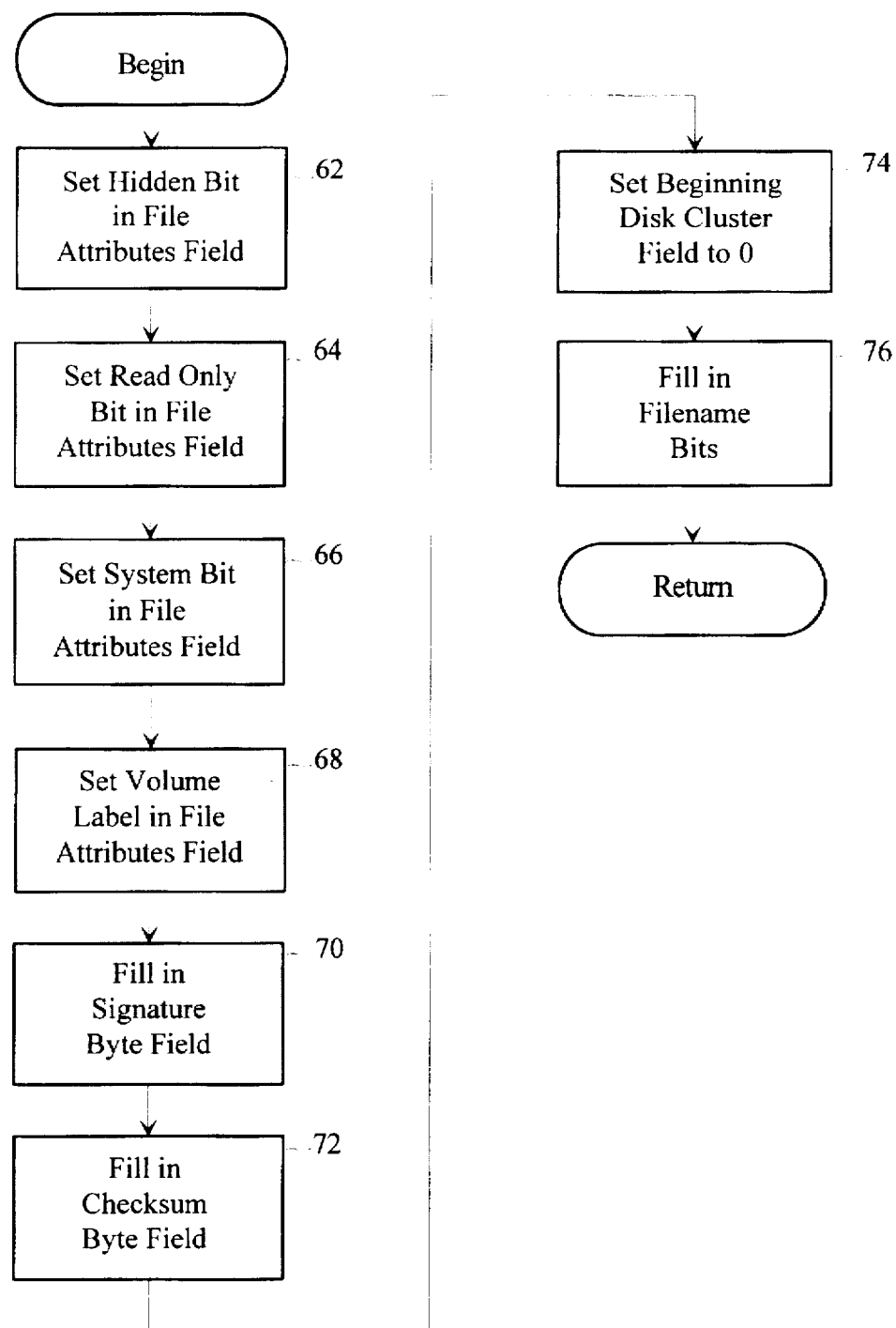
FIG. 5a is a flow chart illustrating the steps performed in creating a long filename directory entry in the preferred embodiment of the present invention.

FIG. 5a is a flowchart depicting the steps performed in filling in a long filename directory entry 20 (see step 59 in FIG. 4). The steps are shown in a given sequence, but those skilled in the art will appreciate that the steps need not be performed in this illustrated sequence. Rather, other sequences are equally acceptable.

Figure 5B:
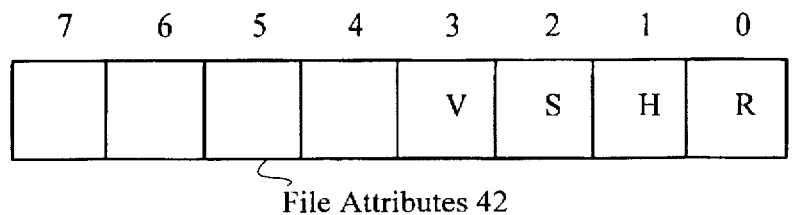
FIG. 5b is a block diagram illustrating bits in the file attributes fields of the long filename directory entry of FIG. 3b.

A hidden bit in the file attributes field 42 is set to have a value of one (step 62). FIG. 5b shows the bits included in the file attributes field 42. The hidden bit is designated by the letter "H" in FIG. 5b and is present at bit position 1 in the file attributes field 42. When the hidden bit is set to a value of one, the directory entry is hidden and is excluded from normal searches of the directory entries 18 and 20. By setting the hidden bit, the long filename directory entries 20 (FIG. 2) are not searched in conventional directory entry searches. The hidden bit is set so that down level systems (i.e., systems that support only short filenames) will not see the long filename directory entries 20.

A read-only bit is also set in the file attributes field (step 64 in FIG. 5a). The read-only bit is designated by the letter "R" in FIG. 5b and is present at bit position 0 in the file attributes field 42. Setting the read-only bit to a value of one indicates that the file is a read-only file and any attempts to write to the file will fail.

A system bit in the file attributes field 42 is set to a value of one (step 66 in FIG. 5a). The system bit is designated by the letter "S" in FIG. 5b and is present at bit position 2 in the file attributes field 42. Setting the system bit to a value of one designates the file as a system file and excludes the directory entry from normal searches of the directory entries 18 and 20. The setting of the system bit to a value of one hides the long filename directory entries 20 from down level operating systems that support only short filenames.

Next, a volume label bit is set in the file attributes field 42 (step 68 in FIG. 5a). The volume label bit is designated by the letter "V" in FIG. 5b and is present at bit position 3 in the file attributes field 42. Setting the volume label bit to a value of one hides the long filename directory entry from "Check Disk" operations of certain disk utility programs. For example, MS-DOS, version 5.0, includes a utility named CHKDSK. The setting of the volume label attribute hides the long filename directory entries from CHKDSK.

The discussion will now return again to the flowchart of FIG. 5a. The signature byte field 38 (FIG. 3b) is filled with a digital signature (step 70 in FIG. 5a). As was mentioned above, the signature distinguishes the order of the long filename directory entries 20 for the file. The checksum field 44 in FIG. 3b is filled with the appropriate checksum of the short filename (step 72 in FIG. 5a). The checksum byte field 44 (FIG. 3b) is used to associate the long filename directory entries 20 with their appropriate short filename by holding a checksum of the short filename. The beginning disk cluster field 50 (FIG. 3b) is set to zero (step 74 in FIG. 5a). The long filename directory entry 20, thus, has no data allocated to it.

This helps to make the long filename directory entry invisible in down level systems. Lastly, the bits for the characters of the long filename are stored in the appropriate long filename fields 40, 48 and 52 (FIG. 3b) of the long filename directory entry 20 (step 76 in FIG. 5a).

By setting the file attributes field 42 (FIG. 5b) bits as described above and by setting the beginning disk cluster field 50 to zero (FIG. 3b), the preferred embodiment of the present invention makes the long filename directory entries nearly invisible to operating systems that support only short filenames (i.e., down level systems). Nevertheless, files with long filenames are still permitted in down level operating systems. The long filename directory entries are not visible in the directory entry listing for down level systems. The combination of bit settings in the file attributes field and the zeroing of the beginning disk cluster field 50 make the long filename directory entries invisible to down level systems. Thus, compatibility problems arising from having long filenames in the down level operating system are minimized. Moreover, utility programs, that may skew the order of directory entries, are not a problem. The signature field 40 (FIG. 3b) and the checksum field 44 may be used in conjunction to rearrange entries that are out of order. In particular, the checksum fields 44 are used to associate long filename directory entries 20 with a short filename directory entry and the signature fields 40 of the long filename directory entries are used to assign related long filename directory entries into proper sequence.

Figure 6A:
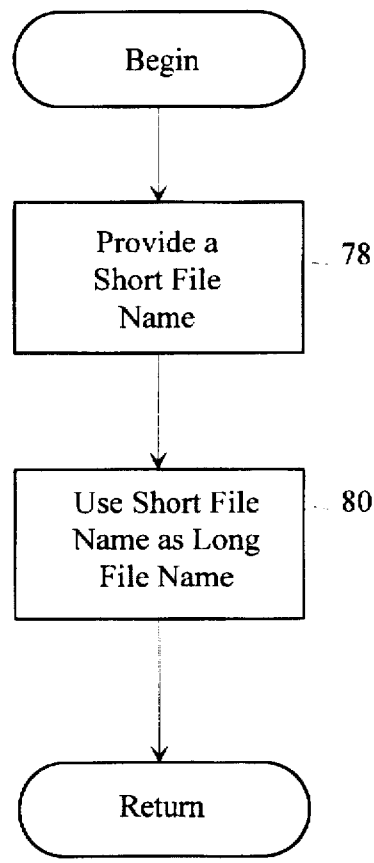
FIG. 6a is a flow chart illustrating the steps performed when a short filename is provided by the user in the preferred embodiment of the present invention.

The discussion above has noted that filenames are created using either short filename APIs or long filename APIs. As a result, when a file is created it has either a long filename or short filename assigned to it by the user, depending on whether a long filename API or short filename API is used. The preferred embodiment of the present invention described herein automatically creates the missing short filename or long filename. For instance, if a file is created using a short filename API, the preferred embodiment described herein establishes a corresponding long filename (which is the same as the short filename). Analogously, if a file is created using a long filename API, the preferred embodiment generates a corresponding short filename that is stored in a short filename directory entry 18. FIG. 6a shows the steps performed by the preferred embodiment when the short filename is provided by the user. In particular, the user provides a short filename (step 78 in FIG. 6a), and the short filename is used as the long filename (step 80). When the user provides a short filename, the system checks whether the name is a valid short filename and whether there are any existing files that pose a conflict (not shown). If there is no problem in terms of format or conflict, the file is assigned the provided short filename. The short filename is then used as the long filename, and there is no long filename directory entry 20 for the file.

Figure 6B:
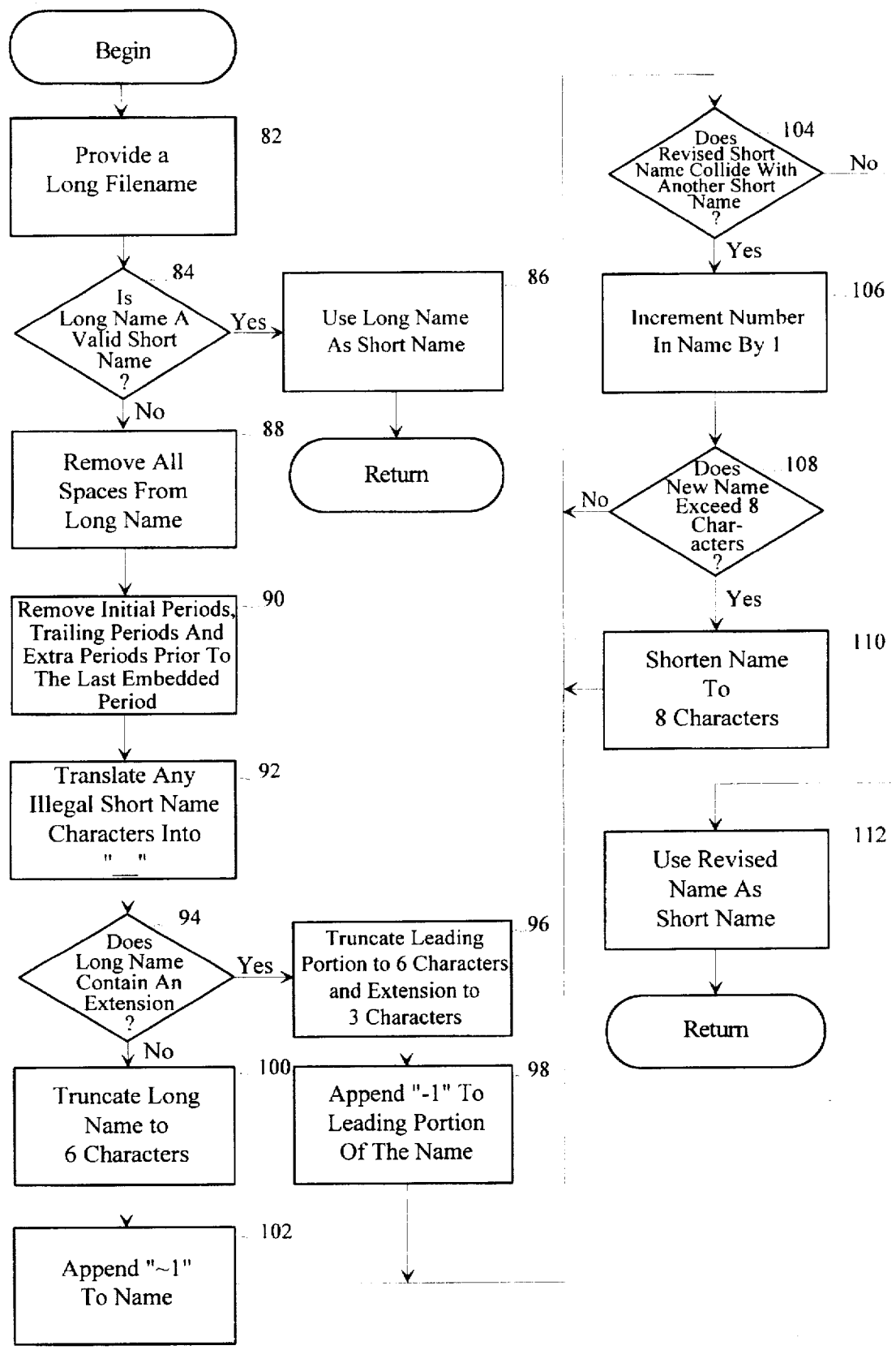
FIG. 6b is a flow chart illustrating the steps performed when a long filename is provided by user in the preferred embodiment of the present invention.

When a file is created using a long filename API, the resulting creation of a corresponding short filename may be quite complex. FIG. 6b is a flowchart illustrating the steps performed to create the short filename in such an instance. Initially, the long filename is provided by the user (step 82 in FIG. 6b). The preferred embodiment then checks whether the long filename is a valid short filename (step 84). If the long filename is a valid short filename, the long filename is used as the short filename (step 86).

However, if the long filename does not qualify as a valid short filename, a short filename is created by removing the spaces from the long filename and using the resulting characters as a proposed short filename (step 88). Initial periods, trailing periods and extra periods that are prior to the last embedded period are then removed from the proposed short filename (step 90). Furthermore, any illegal short filename character is translated into an underscore (step 92). A check of whether the proposed short filename contains an extension is then performed (step 94). If the proposed short filename contains an extension, the leading main portion of the filename is truncated to six characters in length, and the leading three characters of the extension are used (step 96). Subsequently, a "~1" is appended to the leading portion of the remaining characters (step 98) to serve as the short filename.

If the modified long filename does not contain an extension (step 94), the long filename is truncated to six characters (step 100), and "~1" is appended to the truncated filename (step 102) to serve as the short filename. In both of the above-described instances (i.e., the "yes" instance and "no" instance of step 94), the preferred embodiment next checks whether the proposed short filename collides with any other short filename (step 104). If the proposed short filename does not collide with another short filename (i.e., there is no other identical short filename), the proposed short filename is assigned as the short filename for the file (step 112). In the case where the proposed short filename collides with another short filename, the characters that are appended to the name are incremented by one (step 106). Thus, if the number value is initially "~1", the number value is incremented in step 106 by one to "~2". The preferred embodiment checks whether the new proposed short filename exceeds eight characters in length (step 108). If the new proposed short filename does not exceed eight characters in length, the checking of whether the proposed short filename collides with another short filename is repeated (step 104). When the number of characters in the filename exceeds eight characters in length, the new short filename is shortened to eight characters (step 110). In particular, if the length of the leading portion of the filename (ignoring the extension) plus the tilda and the number exceeds eight characters, the leading portion of the filename is shortened until the new proposed short filename (absent the extension) fits in eight characters. For example, the filename "MonKey~10.EXE" is shortened to "MonKe~10.EXE." The above-described steps 104, 106, 108 and 110 are repeated until a short filename is created for the file that is of proper length and that does not collide with another short filename.

The preferred embodiment of the present invention provides a solution to the problem of short filenames while minimizing the compatibility impact of the solution. The use of a common name space that provides a long filename and a short filename for each file allows the files to be used both with applications that support short filenames and applications that support long filenames.

While the present invention has been described with reference to a preferred embodiment thereof, those skilled in the art will appreciate that various changes in scope and form may be made without departing from the present invention as defined in the appended claims.

We claim:

1. In a computer system having a storage, a directory service for accessing directory entries and a file system that uses the directory entries to access files, a method, comprising the computer-implemented steps of:

(a) creating a first directory entry for a file wherein the first directory holds a short filename for the file and the location of the file;

(b) creating a second directory entry for the file wherein the second directory entry holds at least one portion of a long filename having a fixed number of characters and a signature that identifies that the second directory entry holds a first portion of the long filename;

(c) storing the first directory entry and the second directory entry on the storage among the directory entries used by the directory service; (d) accessing the second directory entry by the directory service to access the file; and (e) creating and storing in the storage a sequence of at least one additional directory entry for holding a next sequential portion of the long filename.

2. The method as recited in claim 1 wherein the long filename contains more characters than the short filename.

3. The method as recited in claim 1 wherein each additional directory entry may hold only a fixed number of characters of the long filename and how many additional directory entries are created is dictated by how many additional directory entries are required to store characters of the long filename which are not already stored in the second directory entry.

4. The method as recited in claim 1 wherein the step of creating at least one additional directory entry for the long filename further comprises the step of creating a plurality of additional directory entries.

5. The method as recited in claim 1 wherein the step of creating at least one additional directory entry for the long filename further comprises the step of providing a signature in each additional directory entry that identifies which portion of the long filename the additional directory entry holds.

6. The method as recited in claim 1 wherein the step of creating at least one additional directory entry for the long filename further comprises the step of providing a checksum of the first filename in each additional directory entry.

7. In a data processing system having a processor running an operating system and a memory means having memory locations wherein the operating system is stored in the memory means, a method, comprising the steps of:

(a) storing in a first of the memory locations of the memory means a first directory entry for a file wherein the first directory entry holds a short filename for the file, said short filename including at most a maximum number of characters that is permissible by an application program;

(b) storing in a second of the memory locations of the memory means that is adjacent to the first of the memory locations a second directory entry for the file wherein the second directory entry holds at least a first portion of a long filename for the file, said long filename including a greater number of characters than the maximum number of characters that is permissible by the application program, and (c) accessing one of the directory entries to locate the file.

8. The method as recited in claim 7 wherein the step of storing the second directory further comprises the step of storing a checksum of the short filename in the second directory entry.

9. The method as recited in claim 7, further comprising the step of storing at least one additional directory entry holding a next portion of the long filename in the memory means.

10. The method as recited in claim 9 wherein the step of storing at least one additional directory entry further comprises the step of storing a checksum of the short filename in the additional directory entry.

11. The method as recited in claim 9 wherein the step of storing at least one additional directory entry further comprises the step of storing a signature that uniquely identifies which portion of the long filename is stored in the additional directory entry.

12. In a computer system having a storage, a directory service for accessing directory entries and a file system that uses the directory entries to access files, a comnputer-readable medium holding computer-executable instructions for performing a method comprising computer-implementented steps of:

(a) creating a first directry entry for a file wherein the first directory holds a short filename for the file and the location of the file;

(b) creating a second directory entry for the file wherein the second directory entry holds at least one portion of a long filename having a fixed number of characters;

(c) storing the first directory entry and the second directory entry on the storag among the directory entries used by the directory service; and (d) accessing the second directory entry by the directory service to access the file.

13. The computer-readable medium of claim 12 wherein the long filename contains more characters than the short filename.

14. The computer-readable medium of claim 12 also holding computer-executable instructions for creating and storing in the storage a sequence of at least one additional directory entry for holding a next sequential portion of the long filename.

15. The computer-readable medium of claim 14 wherein each additional directory entry may hold only a fixed number of characters of the long filename and how many additional directory entries are created is dictated by how many additional directory entries are required to store characters of the long filename which are not already stored in the second directory entry.

16. The computer-readable medium of claim 14 wherein the step of creating at least one additional directory entry for the long filename further comprises the step of creating a plurality of additional directory entries.

17. The computer-readable medium of claim 14 wherein the step of creating the second directory entry further comprises the step of providing a signature in the second directory entry that identifies that the second directory entry holds the first portion of the long file name.

18. The computer-readable medium of claim 17 wherein the step of creating at least one additional directory entry for the long filename further comprises the step of providing a signature in each additional directory entry that identifies which portion of the long filename the additional directory entry holds.

19. The computer-readable medium of claim 14 wherein the step of creating at least one additional directory entry for the long filename further comprises the step of providing a checksum of the first filename in each additional directory entry.

20. In a data processing system having a processor running an operating system and a memory means with memory locations, wherein said memory means stores the operating system, a computer-readable medium holding computer-executable instructions for performing a method comprising the steps of:

(a) storing in a first of the memory locations of the memory means a first directory entry for a file wherein the first directory entry holds a short filename for the file, said short filename including at most a maximum number of characters that is permissible by an application program;

(b) storing in a second of the memory locations of the memory means that is adjacent to the first of the memory locations a second directory entry for the file wherein the second directory entry holds at least a first portion of a long filename for the file, said long filename including a greater number of characters than the maximum number of characters that is permissible by the application program; and (c) accessing one of the directory entries to locate the file.

21. The computer-readable medium of claim 20 wherein a checksum of the short filename is stored in the second directory entry.

22. The computer-readable medium of claim 20 wherein at least one additional directory entry is stored to hold a next portion of the long filename in the memory means.

23. The computer-readable medium of clain 22 wherein a signature is stored in the additional directory entry that uniquely identifies which portion of the long filename is stored in the additional directory entry.

24. In a computer system having a directory service for accessing directory entries and a file system that uses the directory entries to access files, a method comprising the computer-implemented steps of:

(a) creating a first directory entry for a file wherein the first directory entry holds a short filename for the file and the location of the file.

(b) creating a second directory entry for a file wherein the second directory entry is configured to appear as if it holds a short filename to a program that uses only short filenames and wherein the second directory entry holds at least one portion of a long filename for the file, said long filename having more characters then the short filename; and (c) accessing one of the first directory entries and the second directory entry by the directory service in order to access the file.

25. The method of claim 24 wherein the program that uses only short filenames is an operating system.

26. The method of claim 24 wherein the program that uses only short filenames is an application program.

27. The method of clain 24 wherein the storage includes storage locations and wherein the first directory entry and the second directory entry are stored in adjacent storage locations.

28. In a computer system having a directory device for accessing directory entries and a file system that uses the directory entries to access files, a computer-readable medium holding computer-executable instructions for executing a method comprising the computer-implemented steps of:

(a) creating a first directory entry for a file wherein the first directory entry holds a short filename for the file and the location of the file;

(b) creating a second directory entry for a file wherein the second directory entry is configured to appear as if it holds a short filename to a program that uses only short filenames and wherein the second directory entry holds at least one portion of a long filename for the file, said long filename having more characters then the short filename; and (c) accessing one of the first directory entries and the second directory entry by the directory service in order to access the file.

* * * * *

UNITED STATES PATENT AND TRADEMARK OFFICE
CERTIFICATE OF CORRECTION

PATENT NO. : 5,758,352  
DATED : May 26, 1998  
INVENTOR(S) : A.R. Reynolds et al.

Page 1 of 2

It is certified that error appears in the above-identified patent and that said Letters Patent is hereby corrected as shown below:

| TITLE PAGE, ITEM | LINE | |
|---|---|---|
| [56] | Refs. Cited (Other Pubs., Item 4) | "sharing" should read --Sharing-- |
| [56] | Refs. Cited (Other Pubs., Item 5) | "1988" should read --1989-- |
| [56] | Refs. Cited (Other Pubs., Item 8) | after "Duncan" insert --,-- |
| COLUMN | | |
| 10 (Claim 1, | 6 line 15) | after "service;" insert paragraph return |
| 10 (Claim 1, | 8 line 17) | after "file; and" insert paragraph return |
| 10 (Claim 7, | 51 line 18) | "program," should read --program;-- |
| 11 (Claim 12, | 8 line 6) | "implementented" should read --implemented-- |
| 11 (Claim 12, | 9 line 7) | "directry" should read --directory-- |
| 11 (Claim 12, | 16 line 14) | "storag" should read --storage-- |
| 11 (Claim 17, | 43 line 5) | "file name" should read --filename-- |

UNITED STATES PATENT AND TRADEMARK OFFICE
CERTIFICATE OF CORRECTION

PATENT NO.   :  5,758,352
DATED        :  May 26, 1998
INVENTOR(S)  :  A.R. Reynolds et al.

It is certified that error appears in the above-identified patent and that said Letters Patent is hereby corrected as shown below:

| COLUMN | LINE | |
|---|---|---|
| 12 (Claim 23, | line 1) | "clain" should read --claim-- |
| 12 (Claim 24, | line 7) | "," should read --;-- |
| 12 (Claim 24, | line 13) | "then" should read --than-- |
| 12 (Claim 27, | line 1) | "clain" should read --claim-- |
| 12 (Claim 28, | line 15) | "then" should read --than-- |

Signed and Sealed this

Twenty-ninth Day of September, 1998

Attest:

BRUCE LEHMAN

Attesting Officer                Commissioner of Patents and Trademarks

(12) EX PARTE REEXAMINATION CERTIFICATE (5551st)
United States Patent
Reynolds et al.

(10) Number: US 5,758,352 C1
(45) Certificate Issued: *Oct. 10, 2006

(54) COMMON NAME SPACE FOR LONG AND SHORT FILENAMES

(75) Inventors: Aaron R. Reynolds, Redmond, WA (US); Dennis R. Adler, Mercer Island, WA (US); Ralph A. Lipe, Woodinville, WA (US); Ray D. Pedrizetti, Issaquah, WA (US); Jeffrey T. Parsons, Redmond, WA (US); Rasipuram V. Arun, Redmond, WA (US)

(73) Assignee: Microsoft Corporation, Redmond, WA (US)

Reexamination Request:
No. 90/007,372, Jan. 8, 2005

Reexamination Certificate for:
Patent No.: 5,758,352
Issued: May 26, 1998
Appl. No.: 08/711,692
Filed: Sep. 5, 1996

(*) Notice: This patent is subject to a terminal disclaimer.

Certificate of Correction issued Sep. 29, 1998.

Related U.S. Application Data

(63) Continuation of application No. 08/427,004, filed on Apr. 24, 1995, now Pat. No. 5,579,517, which is a continuation of application No. 08/041,497, filed on Apr. 1, 1993, now abandoned.

(51) Int. Cl.
*G06F 12/00* (2006.01)
*G06F 17/30* (2006.01)

(52) U.S. Cl. ............................... 707/200; 707/1; 707/6
(58) Field of Classification Search ............ 707/1, 707/6, 200
See application file for complete search history.

(56) References Cited

U.S. PATENT DOCUMENTS

| | | | | |
|---|---|---|---|---|
| 4,058,672 A | * | 11/1977 | Crager et al. | 370/394 |
| 4,780,821 A | | 10/1988 | Crossley | 718/100 |
| 4,945,475 A | | 7/1990 | Bruffey et al. | 707/1 |
| 4,945,476 A | | 7/1990 | Bodick et al. | 600/301 |
| 4,987,531 A | | 1/1991 | Nishikado et al. | 707/200 |
| 4,999,766 A | | 3/1991 | Peters et al. | 707/10 |
| 5,058,000 A | | 10/1991 | Cox et al. | 707/10 |

(Continued)

FOREIGN PATENT DOCUMENTS

| | | |
|---|---|---|
| EP | 0 462 587 B1 | 12/1996 |
| EP | 0 578 205 B1 | 3/2000 |
| EP | 0 618 540 B1 | 12/2001 |
| JP | 64-41039 | 2/1989 |
| JP | 1 315 843 | 12/1989 |
| JP | 2 148 341 | 7/1990 |
| JP | 4-297 934 | 10/1992 |
| JP | 6 019 763 | 1/1994 |

OTHER PUBLICATIONS

Manes, S. "Taking a Gamble with WordVision", PC Magazine, vol. 3, No. 6, pp. 211–221, Apr. 3, 1984.*
Jeffries, R. "What's Ahead for DOS", PC Magazine, vol. 4, No. 24, pp. 95–97, Nov. 26, 1985.*

(Continued)

*Primary Examiner*—Luke S Wassum

(57) ABSTRACT

An operating system provides a common name space for both long filenames and short filenames. In this common namespace, a long filename and a short filename are provided for each file. Each file has a short filename directory entry and may have at least one long filename directory entry associated with it. The number of long filename directory entries that are associated with a file depends on the number of characters in the long filename of the file. The long filename directory entries are configured to minimize compatibility problems with existing installed program bases.

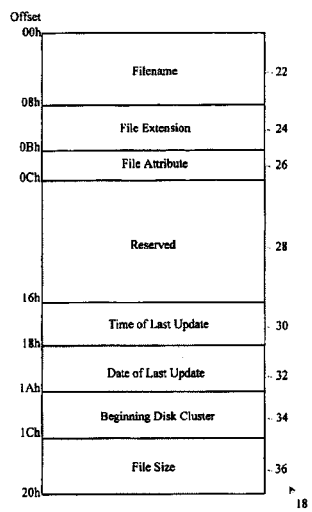

U.S. PATENT DOCUMENTS

| | | | | |
|---|---|---|---|---|
| 5,083,264 | A | | 1/1992 | Platteter et al. .................. 714/5 |
| 5,129,088 | A | | 7/1992 | Auslander et al. ............. 711/1 |
| 5,179,703 | A | | 1/1993 | Evans ........................ 717/122 |
| 5,202,982 | A | | 4/1993 | Gramlich et al. ............... 707/2 |
| 5,202,983 | A | | 4/1993 | Orita et al. ..................... 707/4 |
| 5,287,502 | A | | 2/1994 | Kaneko .......................... 707/4 |
| 5,291,595 | A | | 3/1994 | Martins ...................... 707/200 |
| 5,307,494 | A | * | 4/1994 | Yasumatsu et al. ......... 707/200 |
| 5,313,646 | A | | 5/1994 | Hendricks et al. .......... 707/101 |
| 5,317,733 | A | | 5/1994 | Murdock .................... 707/203 |
| 5,329,427 | A | | 7/1994 | Hogdahl ..................... 361/730 |
| 5,355,497 | A | * | 10/1994 | Cohen-Levy ............... 707/200 |
| 5,359,724 | A | | 10/1994 | Earle .......................... 707/205 |
| 5,359,725 | A | | 10/1994 | Garcia et al. ............... 707/200 |
| 5,363,487 | A | | 11/1994 | Willman et al. ............... 710/8 |
| 5,367,671 | A | | 11/1994 | Feigenbaum et al. .......... 707/1 |
| 5,371,885 | A | | 12/1994 | Letwin .......................... 707/205 |
| 5,388,257 | A | | 2/1995 | Bauer .......................... 707/1 |
| 5,412,808 | A | | 5/1995 | Bauer .......................... 707/1 |
| 5,421,001 | A | | 5/1995 | Methe .......................... 707/1 |
| 5,434,974 | A | | 7/1995 | Loucks et al. ............... 707/101 |
| 5,437,029 | A | | 7/1995 | Sinha ......................... 707/200 |
| 5,483,652 | A | | 1/1996 | Sudama et al. ............... 707/10 |
| 5,485,606 | A | | 1/1996 | Midgdey et al. .............. 707/10 |
| 5,535,375 | A | | 7/1996 | Eshel et al. .................... 703/27 |
| 5,537,592 | A | | 7/1996 | King et al. .................. 707/200 |
| 5,596,755 | A | | 1/1997 | Pletcher et al. ............. 710/261 |
| 5,627,996 | A | | 5/1997 | Bauer .......................... 703/20 |
| 5,694,606 | A | | 12/1997 | Pletcher et al. ............. 710/261 |
| 5,745,752 | A | | 4/1998 | Hurvig et al. ............... 707/200 |
| 5,745,902 | A | | 4/1998 | Miller et al. ................ 707/200 |
| 5,754,848 | A | | 5/1998 | Hanes ........................ 707/200 |
| 5,758,352 | A | | 5/1998 | Reynolds et al. ........... 707/200 |
| 5,761,675 | A | * | 6/1998 | Isenberg ..................... 707/200 |
| 5,765,169 | A | | 6/1998 | Conner ....................... 707/200 |
| 5,819,275 | A | | 10/1998 | Badger et al. .............. 707/100 |
| 5,926,805 | A | | 7/1999 | Hurvig et al. ................. 707/2 |
| 6,055,527 | A | | 4/2000 | Badger et al. ................. 707/2 |

OTHER PUBLICATIONS

Prosise, J. "Retrofitting a DOS System", PC Magazine, vol. 5, No. 21, pp. 303–313, Dec. 9, 1986.*

Sanders, S.L., ed. "The $R/O Read Only", Jun. 1987.*

Wendin Inc. "Wendin to Release Wendin–DOS in September", PR Newswire Press Release, Aug. 28, 1987.*

Mefford, M.J. "Adding Notes to Directories", PC Magazine, vol. 6, No. 15, pp. 385–394, Sep. 15, 1987.*

Petzold, C. "OS–2: A New Beginning for PC Applications", PC Magazine, vol. 7, No. 7, pp. 273–281, Apr. 12, 1988.*

Digital Research Inc. "Digital Research Introduces POMable, Single–User DOS–Compatible Operating System", Press Release, Jun. 8, 1988.*

Derfler, F.J. Jr. "Building Workgroup Solutions: AppleTalk", PC Magazine, vol. 7, No. 22, pp. 151–160, Dec. 27, 1988.*

World Software Corporation "Extend–A–Name: The 60 Character File Name Utility", User's Guide and Reference Manual, 1988.*

Duncan, R. "Comparing DOS and OS–2 File Systems", PC Magazine, vol. 8, No. 3, pp. 321–327, Feb. 14, 1989.*

Duncan, R. "Design Goals and Implementation of the New High Performance File System", Microsoft Systems Journal, pp. 1–13, Sep. 1989.*

Bonner, P. "What's In a Name?", PC Computing, vol. 2, No. 9, pp. 169–170, Sep. 1989.*

Gralla, P. "Factors Impeding the OS/2 Operating System", PC Computing, vol. 2, No. 12, p. 13, Dec. 1989.*

Greenberg, R.M. "Compress and Expand the Files on Your Hard Disk Automatically", PC Magazine, vol. 8, No. 21, pp. 299–310, Dec. 12, 1989.*

Petzold, C. "1989: The Year in Operating Systems", PC Magazine, vol. 9, No. 1, p. 172, Jan. 16, 1990.*

Duncan, R. "Getting Acquainted with the Latest Version of OS/2: 1.2 (Part 1)", PC Magazine, vol. 9, No. 6, pp. 343–346, Mar. 27, 1990.*

Duncan, R. "Getting Acquainted with the Latest Version of OS/2: 1.2 (Part 2)", PC Magazine, vol. 9, No. 7, pp. 317–321, Apr. 10, 1990.*

Duncan, R. "Using Long Filenames and Extended Attributes (Part 1)", PC Magazine, vol. 9, No. 8, pp. 317–323, Apr. 24, 1990.*

McCormick, J. "Presentation Manager Under OS/2 Encourages Lengthy Name–Calling", Government Computer News, vol. 9, No. 10, pp. 16–17, May 14, 1990.*

Duncan, R. "Using Long Filenames and Extended Attributes (Part 2)", PC Magazine, vol. 9, No. 9, pp. 305–309, May 15, 1990.*

Winship, S. "DOS Shells", PC Week, vol. 7, No. 25, p. 128, Jun. 25, 1990.*

Neuhaus, T. "Databases", PC Magazine, vol. 9, No. 12, pp. 435–437, Jun. 26, 1990.*

Jackson, P. "Apple Talk: The Need for Coexistence Between Apple Macintosh and the IBM PC", PC User, No. 145, p. 171, Nov. 7, 1990.*

Bonner, P. "GeoWorks Ensemble is a One–Size–Fits–All GUI", PC Computing, vol. 3, No. 12, pp. 45–46, Dec. 1990.*

Acerson, K.L. "WordPerfect® 5.1: The Complete Reference", Berkeley:Osborne McGraw–Hill, pp. 272–278, 593–595, 612–615, 1246. ISBN 0–07–881634–3. Z52.5.W65A26 1990.*

"CD–ROM: Rock Ridge Group Submits Preliminary CD–ROM Specs to NIST", EDGE: Work–Group Computing Report, vol. 2, No. 44, Mar. 25, 1991.*

Rock Ridge Technical Working Group Rock Ridge Interchange Protocol Version 1, Rev. 1.09, Jul. 24, 1991.*

Hayes, F. "Making CD–ROM Usable for UNIX", Unix World, vol. VIII, No. 7, p. 123, Jul. 1991.*

Somerson, P. "DOS 5.0: Microsoft Corporation's Improved Operating System", PC Computing, vol. 4, No. 7, pp. 97–113, Jul. 1991.*

Rizzo, J. "Disks of a Different Color: Running MSDOS Disks on an Apple Macintosh", MacUser, vol. 7, No. 8, pp. 231–234, Aug. 1991.*

Simon, Barry "What Do You Do To Overcome Disk Disasters", PC Magazine, vol. 10, No. 15, pp. 409–414, Sep. 10, 1991.*

Chin, C. "Using Unused Bytes in Directory Entry?", excerpt from comp.os.msdos.programmer newsgroup thread, Oct. 14, 1991.*

Proteo Technology "Proteo Technology Announces Way You Work New PC Productivity Software That Lets People Master Their PCs Without Knowing DOS", Press Release, Oct. 21, 1991.*

Young, A. "The CD–ROM Standards Frontier: Rock Ridge", CD–ROM Professional, vol. 4, No. 6, pp. 53–56, Nov. 1991.*

Zelnick, N. "Way You Work Does It Your Way", PC Magazine, vol. 10, No. 22, pp. 62–63, Dec. 31, 1991.*

Bonner, P. "Build a Document Manager Under Windows", PC Computing, vol. 4, No. 12, pp. 275–281, Dec. 1991.*

Hotch, R. "Will This Be The Way You Work?", Nation's Business, Mar. 1992.*
Prosise, J. "Tutor", PC Magazine, vol. 11, No. 5, pp. 397–399, Mar. 17, 1992.*
Bonner, P. "Windows 3.1: Faster and Smarter", PC Computing, vol. 5, No. 5, pp. 128–139, May 1992.*
Smith, G. "OS/2 2.0 Does the Job", PC Computing, vol. 5, No. 5, pp. 48–55, May 1992.*
Busch, D.D. "4DOS: DOS As You Like It", Computer Shopper, vol. 12, No. 7, pp. 698–699, Jul. 1992.*
Gralla, P. "Shareware", Computer Shopper, vol. 12, No. 9, pp. 701–703, Sep. 1992.*
Somerson, P. "Spy–Proof Your PC: 13 Igenious Ways to Keep Your System Secure", PC Computing, vol. 5, No. 9, pp. 218–237, Sep. 1992.*
Ruley, J.D. "Feature–Rich Beta at a Bargain Price", Windows Magazine, Oct. 1, 1992.*
Giovetti, A.C. "Way You Work: Personal Office", Compute!, Issue 146, p. 126, Nov. 1992.*
Rohan, R. "Golden Retriever Fetches Files in Windows", Computer Shopper, vol. 12, No. 11, p. 947, Nov. 1992.*
Microsoft Chicago Long Filename Specification, Revision 0.5, Dec. 4, 1992.*
Goh, S. "MS DOS 6.0", excerpt of a comp.os.msdos.misc newsgroup thread, Feb. 20, 1993.*
"Access Review Too Harsh", Letters Column, Windows Magazine, No. 403, p. 18, Mar. 1, 1993.*
Maird, M.K. "What are the Benefits of 4DOS?", excerpt of a comp.os.msdos.4dos newsgroup thread, Mar. 7, 1993.*
Above Software, "Above Software Introduces Golden Retriever 2.0b", Press Release, Mar. 29, 1993.*
O'Malley, C. "Fetching Desktop Files: Standalone Document Managers", Windows Sources, vol. 1, No. 2, p. 443, Mar. 1993.*
Fowler, D. "Cross Talking: Sharing Files Over a Mixed–Platform Network", Computer Shopper, vol. 13, No. 3, pp. 783–785, Mar. 1993.*
Berst, J. "Come Closer and I'll Tell You Some Secrets About Windows 4.0", Windows Magazine, No. 404, p. 43, Apr. 1, 1993.*
Mallory, J. "Breakthrough on DOS Filename Limits", Newsbytes, Apr. 12, 1993.*
Almax Software "Longer Filenames for DOS", Press Release, May 1993.*
Rettig, H. "Custom Windows Made Easy", Windows Magazine, No. 406, p. 264, Jun. 1, 1993.*
Capen, T. "The Ultimate File Manager", Corporate Computing, vol. 2, No. 6, p. 54, Jun. 1993.*
Lincoln, S. "Death to 8+3 Filenames!", excerpt from a comp.os.ms–windows.apps newsgroup thread, Jul. 9, 1993.*
Lewallen, D., F. Scot and E. Bott "The NT Desktop—Like Windows, Only Better", PC Computing, vol. 6, No. 7, pp. 124–127, Jul. 1993.*
Nilsson, B.A. "Sherlock Solves the Case of the Cryptic Windows Filenames", Computer Shopper, vol. 13, No. 7, p. 434, Jul. 1993.*
2010 Software "Sherlock 2.0 Released by 2010 Software", Press Release, Aug. 9, 1993.*
Clark, I.M. "Proposed DOS Header Record", excerpt from comp.os.msdos.programmer newsgroup thread, Aug. 11, 1993.*
Allen, J. et al. "The Vices and Virtues of MS–DOS", PC Computing, vol. 6, No. 8, pp. 27–31, Aug. 1993.*

Wagner, M. "Developers to Get Tour of 'Chicago'—New Microsoft OS", Open Systems Today, No. 136, p. 3, Nov. 8, 1993.*
Idol, C. "Sherlock", Compute, vol. 15, No. 11, p. 150, Nov. 1993.*
DeVoney, C. and R.C. Kennedy "NT Has Arrived", Windows Sources, vol. 1, No. 10, pp. 283–294, Nov. 1993.*
Davis, F.E. "NT, No Thanks; Wait for 4.0", Windows Sources, vol. 1, No. 10, pp. 105–106, Nov. 1993.*
Mathisen, T. "Novell's DOS 7 Offers Multitasking, Memory Management, and Peer–To–Peer Networking, Is it a Better DOS Than Microsoft's?", Byte Magazine, Jun. 1994.*
Olsen, M. "Student Writes Free Version of DOS", University of Wisconsin at River Falls Student Voice, Dec. 1, 1994.*
Saiedian, H. and M. Siddiqi "A Framework for the Assessment of Operating Systems for Small Computers", ACM SIGICE Bulletin, vol. 21, No. 4, pp. 2–27, Apr. 1996.*
Cluts, N.W. "Making Room for Long Filenames", Microsoft Developer Network Technology Team, downloaded from msdn.microsoft.com/library/en–us/dnfiles/html/msdn_longfile.asp?frame=true, Aug. 1996.*
Styer, E. "Disks", ACM SIGICE Bulletin, vol. 23, No. 1, pp. 22–32, Jul. 1997.*
vinDaci "Long Filename Specification", downloaded from home.teleport.com/~brainy/lfn.htm, Jan. 6, 1998.*
Mattias "25 Years of DR DOS History", downloaded from freedos.sourceforge.net/freedos/news/bits/drdos–hist.txt, Sep. 18, 2000.*
The PC Guide "File Allocation Tables", downloaded from www.pcguide.com/ref/hdd/file, Apr. 17, 2001.*
Tanenbaum, A.S. "Modern Operating Systems", Upper Saddle River:Prentice Hall, pp. 430–447, 2001.*
Hall, J. "An Overview of FreeDOS", downloaded from freedos.sourceforge.net/freedos/news/bits/article_fsm.txt, 2002.*
Beta Systems "DOS History", downloaded from www.powernet.co.za/info/DOS/His.Htm, Apr. 30 2003.*
Fuchs, C. "DOS Frequently Asked Questions", downloaded from www.drdos.new/faq, Jan. 1, 2004.*
jh "20 Years of DOS History", downloaded from freedos.sourceforge,net/freedos/news/bits/doshist.txt, Mar. 25, 2005.*
Wikipedia "Comparison of File Systems", downloaded from www.wikipedia.org, Aug. 29, 2005.*
Wikipedia "DOS", downloaded from www.wikipedia.org, Sep. 15, 2005.*
Bonner, Paul, "What's in a Name?," Sep. 1988, *PC–Computing*, vol. 2,(9), p. 169(2).
Bonner, Paul, "Build a Document Manager Under Windows," Dec. 1991, *PC–Computing*, vol. 4(12), p. 275–277, 280–283.
Comer, D. et al., "The Tilde File Naming Scheme" *IEEE 6th International Conference on Distributed Computing Systems*, Cambridge, Massachusetts, May 23, 1986, pp. 509–514.
William M. Crow, "Encapsulation of Applications in the New Wave Environment," *Hewlett–Packard Journal*, Aug. 1989, 40(4), p. 57–64.
Ray Duncan, "Design Goals and Implementation of the New High Performance File System" *Microsoft Systems Journal*, Sep. 1989, 4(5), pp. 1–13.
Ray Duncan, "Using Long Filenames and Extended Attributes" *Parts 1 & 2, PC Magazine*, Apr. 24 & May 15, 1990, 9(8,9), pp. 317–323 & 305–309.

Les Freed, "High–End PC–to–MAC LAN Solutions", *PC Magazine*, May 1992, 11(9), p. 203(8).

Glass, Brett, "Create Your Own Environment," *PC–Computing*, Oct. 1990, 3(10), 106–111.

Hurwicz, Mike, "MS–DOS 3.1 Makes It Easy to Use IBM PCs on a Network," *Data Communications*, Nov. 1985, 223–237.

Mallory, Jim, "Breakthrough on DOS Filename Limits," *Newsbytes News Network*, Apr. 12, 1993, 3 pages.

McCormick, John, "Presentation Manager Under OS/2 Encourages Lengthy Name–Calling," *Government Computer News*, May 14, 1990, 9(10), p. 16(2).

O'Malley, Chris, "Fetching Desktop Files: Standalone Document Managers," *Window Sources*, Mar. 1993, 1(2), p. 443(1).

Rohan, Rebecca, "Golden Retriever Fetches Files in Windows," *Computer Shopper*, Nov. 1992, 12(11), p. 947(1).

Samuel J. Leffler et al., "The Design and Implementation of the 4.3 BSD UNIX Operating System," *Addison–Wesley Publishing Company* 1989, Chapter 2, pp. 34–36.

Trivette, Donald B., "Utility Provides 60–Character Filenames," *PC Magazine*, Sep. 1988, 7(16), p. 56(1).

Wang, Y.E.G., "Universal File Names for Ada," *Ada Letters*, Jan./Feb. 1990, Integrated Software, Inc., New York, NY, vol. X(1), pp. 111–117.

"The Intelligent Way to Search," Oct. 1987, News Release, Dateline: Burlington, MA.

"File sharing Protocol," Microsoft Corporation, Nov. 7, 1988, 71 pages.

"World Software Corporation (WSC) Launches Extend–A–Name in Europe," *Computer Product Update*, Jul. 27, 1990.

"Above Software Introduces Golden Retriever 2.0b'," News Release, Dateline: Irvine, CA, Mar. 29, 1993.

Len, A.F. et al.,"New Improved Windows," *PC World*, Dec. 1993, 11(12), p. 252(3).

Mark G. Sobell , "A Practical Guide to the Unix System," Dec. 1989, System V Release 3 and BSD 4.3, pp. 12–14, 32, 66–69, 82–83 and 88–89.

"Appendix C How Filenames Are Converted," *Microsoft LAN Manager Services for Macintosh Administrator's Guide*, Jun. 1991, Version 1.0, for Microsoft Operating System/2, Microsoft Corporation, pp. 119–123.

"Long Filename Specification", Hardware White Paper, Designing Hardware for Microsoft® Operating Systems, Microsoft Corporation, Dec. 4, 1992, version 0.5, http://www.psdever.net/documents/lonfilename.pdf?theid=39, 19 pages.

Protest to Patent Application No. Canadian Patent Application No. 2,120,461, In The Canadian Patent Office, Submission under Section 34.1, filing of Prior Art, Sep. 24, 2004, 13 pages.

In the United States Patent and Trademark Office, In re Reexamination of 5,579,517, Declaration of Annie Pearson, Dec. 1, 2004, 2 pages.

Translation into English of Plaintiff's Grounds for Nullity, *Dr. Friedrich–Karl Boese* v. *Microsoft Corporation*, Dec. 21, 2004, 1–25.

Merkmalsanalyse Anspruch 1, Exhibit 5 of Reference 76, 1 page.

Merkmalsanalyse Anspruch 12, Exhibit 6 of Reference 76, 1 page.

Article from Newsgroup comp.archives, Exhibit 7a of Reference 27, Aug. 21, 1992, 1 page.

Article from Newsgroup comp.std.misc, Exhibit 7b of Reference 27, Mar. 21, 1991, 3 pages.

Article from Newsgroup comp.new.prod, Exhibit 7c of Reference 27, Aug. 20, 1991, 1 page.

Article from Newsgroup comp.unix.bsd and comp.os.linux, Exhibit 7d of Reference 27, Dec. 12, 1992, 1 page.

Response to Official Communication re: EP Application No. 94 105 169.0–2201 dated May 10, 2000, Exhibit 14 of Reference 76, 9 pages.

"Common Name Space for Long and Short Filenames," *Microsoft Corporation*, Exhibit 15 of Reference 76, 34 pages.

Communication Under Rule 51(4) EPC re: EP Application No. 94 105 169.0–2201, Dec. 19, 2000, Exhibit 16 of Reference 76, 39 pages.

Rock Ridge Interchange Protocol, Version 1, AN ISO 9660:1988 Compliant Approach to Providing Adequate CD–ROM Support for POSIX File System Semantics; Rock Ridge Technical Working Group, Revision 1.09, Jul. 24, 1991.

"Rock Ridge Group Submits Preliminary CD–ROM Specs To NIST—Sixteen Companies Offer Their Support" *The Florida SunFlash*, vol. 27 #11, Mar. 1991.

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 24–28 is confirmed.

Claims 9, 14 and 22 are cancelled.

Claims 1, 7, 8, 10–12, 15–17, 19–21 and 23 are determined to be patentable as amended.

Claims 2–6, 13 and 18, dependent on an amended claim, are determined to be patentable.

New claims 29–44 are added and determined to be patentable.

1. In a computer system having a storage, a directory service for accessing directory entries and a file system that uses the directory entries to access files, a method, comprising the computer-implemented steps of:
   (a) creating a first directory entry for a file wherein the first directory *entry* holds a short filename for the file and the location of the file;
   (b) creating a second directory entry for the file wherein the second directory entry holds at least one portion of a long filename having a fixed number of characters *and a signature that identifies that the second directory entry holds a first portion of the long filename*;
   (c) storing the first directory entry and the second directory entry on the storage among the directory entries used by the directory service;
   (d) accessing the second directory entry by the directory service to access the file; and
   (e) creating and storing in the storage a sequence of at least one additional directory entry for holding a next sequential portion of the long filename.

7. In a data processing system having a processor running an operating system and a memory means having memory locations wherein the operating system is stored in the memory means, a method, comprising the steps of:
   (a) storing in a first of the memory locations of the memory means a first directory entry for a file wherein the first directory entry holds a short filename for the file, said short filename including at most a maximum number of characters that is permissible by an application program;
   (b) storing in a second of the memory locations of the memory means that is adjacent to the first of the memory locations a second directory entry for the file wherein the second directory entry holds at least a first portion of a long filename for the file, said long filename including a greater number of characters than the maximum number of characters that is permissible by the application program;
   (c) storing at least one additional directory entry holding a next portion of the long filename in the memory means; and
   [(c)] (*d*) accessing one of the directory entries to locate the file.

8. The method as recited in claim 7 wherein the step of storing the second directory *entry* further comprises the step of storing a checksum of the short filename in the second directory entry.

10. The method as recited in claim [9] *7* wherein the step of storing at least one additional directory entry further comprises the step of storing a checksum of the short filename in the additional directory entry.

11. The method as recited in claim [9 wherein the step of storing at least one additional directory entry further comprises the step of] *7 further comprising* storing a signature *in each of the second directory entry and the at least one additional directory entry* that uniquely identifies which portion of the long filename is stored in [the additional] *that* directory entry.

12. In a computer system having a storage, a directory service for accessing directory entries and a file system that uses the directory entries to access files, a computer-readable medium holding computer-executable instructions for performing a method comprising computer-implemented steps of:
   (a) creating a first directory entry for a file wherein the first directory holds a short filename for the file and the location of the file;
   (b) creating a second directory entry for the file wherein the second directory entry holds at least one portion of a long filename having a fixed number of characters;
   (*c*) *creating a sequence of at least one additional directory entry for holding a next sequential portion of the long filename;*
   [(c)] (*d*) storing the first directory entry [and] the second directory entry *and the at least one addtional directory entry* on the storage among the directory entries used by the directory service; and
   (*e*) accessing the second directory entry *and the at least one additional directory entry* by the directory service to access the file.

15. The computer-readable medium of claim [14] *12* wherein each additional directory entry may hold only a fixed number of characters of the long filename and how many additional directory entries are created is dictated by how many additional directory entries are required to store characters of the long filename which are not already stored in the second directory entry.

16. The computer-readable medium of claim [14] *12* wherein the step of creating at least one additional directory entry for the long filename further comprises the step of creating a plurality of additional directory entries.

17. The computer-readable medium of claim [14] *12* wherein the step of creating the second directory entry further comprises the step of providing a signature in the second directory entry that identifies that the second directory entry holds the first portion of the long filename.

19. The computer-readable medium of claim [14] *12* wherein the step of creating at least one additional directory entry for the long filename further comprises the step of providing a checksum of the first filename in each additional directory entry.

20. In a data processing system having a processor running an operating system and a memory means with memory locations, wherein said memory means stores the operating system, a computer-readable medium holding computer-executable instructions for performing a method comprising the steps of:

(a) storing in a first of the memory locations of the memory means a first directory entry for a file wherein the first directory entry holds a short filename for the file, said short filename including at most a maximum number of characters that is permissible by an application program;

(b) storing in a second of the memory locations of the memory means that is adjacent to the first of the memory locations a second directory entry for the file wherein the second directory entry holds at least a first portion of a long filename for the file, said long filename including a greater number of characters than the maximum number of characters that is permissible by the application program;

(c) storing at least one additional directory entry in at least one other of the memory locations that is adjacent to the second of the memory locations of the memory means wherein the at least one additional directory entry holds a next portion of the long filename; and

[(c)] (d) accessing one of the directory entries to locate the file.

21. The computer-readable medium of claim 20 wherein a checksum of the short filename is stored in the second directory entry *and the at least one additional directory entry*.

23. The computer-readable medium of claim [22] *20* wherein a signature is stored in *each of the second directory entry and* the *at least one* additional directory entry [that]*,* *each signature* uniquely [identifies] *identifying* which portion of the long filename is stored in [the additional] *its respective* directory entry.

29. The method as recited in claim 1, wherein the signature is stored at a beginning of the second directory entry and comprises characters that are not permitted to be used as characters of a short filename of a file.

30. The method as recited in claim 5, wherein the signature provided in each additional directory entry is stored at a beginning of that additional directory entry and comprises characters that are not permitted to be used as characters of a short filename of a file.

31. The method as recited in claim 11, wherein the signatures are stored at the beginnings of the second directory entry and the at least one additional directory entry and each signature comprises characters that are not permitted to be used as characters of a short filename of a file.

32. The computer-readable medium as recited in claim 17, wherein the signature provided in the second directory entry is stored at a beginning of the second directory entry and comprises characters that are not permitted to be used as characters of a short filename of a file.

33. The computer-readable medium as recited in claim 18, wherein the signatures provided in each additional directory entry are stored at the beginnings of each additional directory entry and comprise characters that are not permitted to be used as characters of a short filename of a file.

34. The method as recited in claim 23, wherein the signatures stored in the second directory entry and the at least one additional directory entry are stored at a beginning of each respective directory entry and comprise characters that are not permitted to be used as characters of a short filename of a file.

35. The method as recited in claim 24, wherein the step of creating the second directory entry further comprises the step of storing a checksum of the short filename in the second directory entry.

36. The method as recited in claim 24, further comprising the step of creating at least one additional directory entry holding a next portion of the long filename.

37. The method as recited in claim 36 wherein the step of creating at least one additional directory entry further comprises the step of storing a checksum of the short filename in the at least one additional directory entry.

38. The method as recited in claim 36, further comprising storing a signature in each of the second directory entry and the at least one additional directory entry that uniquely identifies which portion of the long filename is stored in that directory entry.

39. The method as recited in claim 38, wherein the signatures stored in the second directory entry and the at least one additional directory entry are stored at a beginning of each respective directory entry and comprise characters that are not permitted to be used as characters of a short filename of a file.

40. The computer-readable medium as recited in claim 28 wherein the step of creating the second directory further comprises the step of storing a checksum of the short filename in the second directory entry.

41. The computer-readable medium as recited in claim 28, further comprising the step of creating at least one additional directory entry holding a next portion of the long filename.

42. The computer-readable medium as recited in claim 41, wherein the step of creating at least one additional directory entry further comprises the step of storing a checksum of the short filename in the at least one additional directory entry.

43. The computer-readable medium as recited in claim 41, further comprising storing a signature in each of the second directory entry and the at least one additional directory entry that uniquely identifies which portion of the long filename is stored that directory entry.

44. The computer-readable medium as recited in claim 43, wherein the signatures stored in the second directory entry and the at least one additional directory entry are stored at a beginning of each respective directory entry and comprise characters that are not permitted to be used as characters of a short filename of a file.

\* \* \* \* \*